July 18, 1972 B. A. SAWYER Re. 27,436
MAGNETIC POSITIONING DEVICE
Original Filed May 31, 1966 2 Sheets-Sheet 1
FIG. 1.
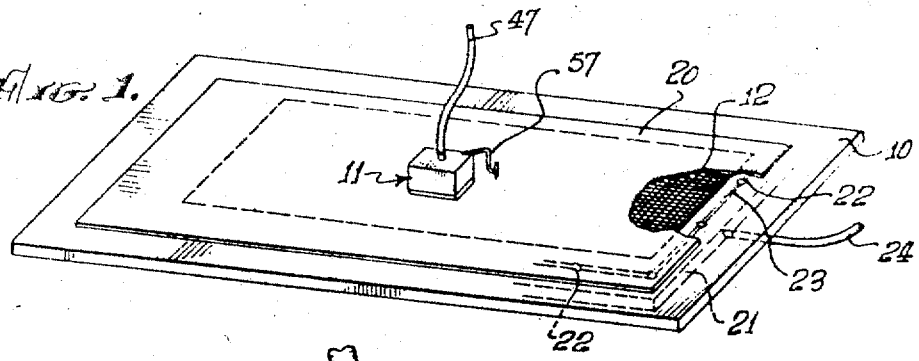
FIG. 2.
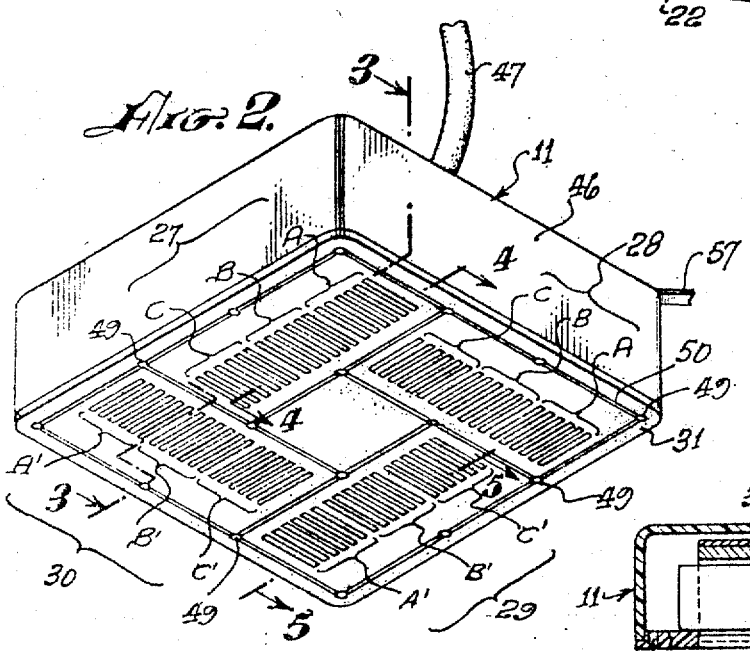
FIG. 3.
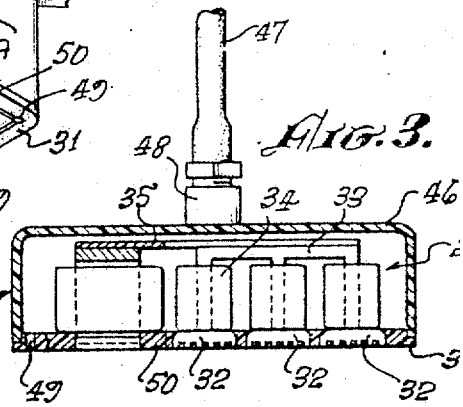
FIG. 4.
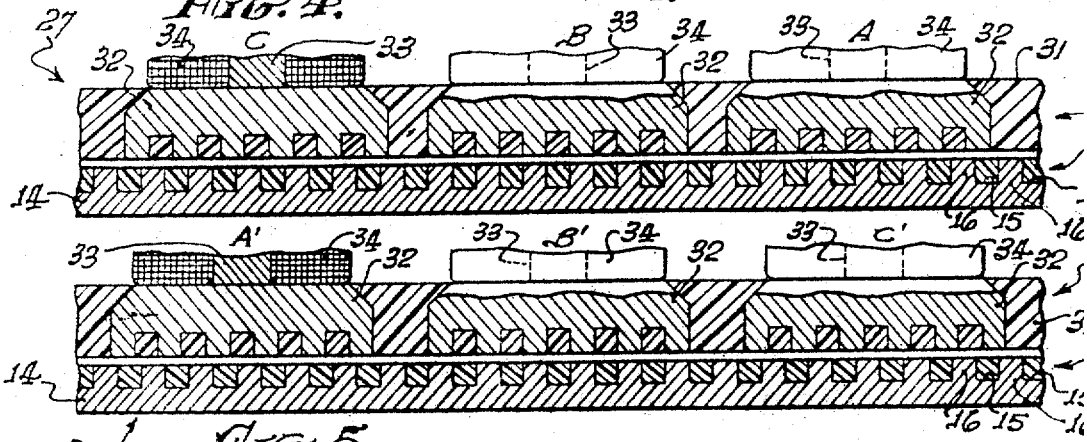
FIG. 5.
INVENTOR
BARRY A. SAWYER,
By His Attorneys
HARRIS, KIECH, RUSSELL & KERN July 18, 1972 B. A. SAWYER Re. 27,436

MAGNETIC POSITIONING DEVICE

Original Filed May 31, 1966 2 Sheets-Sheet 2

INVENTOR.
BRUCE A. SAWYER,
By His Attorneys
HARRIS, KIECH, RUSSELL & KERN

United States Patent Office

Re. 27,436
Reissued July 18, 1972

27,436

MAGNETIC POSITIONING DEVICE

Bruce A. Sawyer, 20120 Allentown Drive,
Woodland Hills, Calif. 91364

Original No. 3,376,578, dated Apr. 2, 1968, Ser. No. 554,181, May 31, 1966. Application for reissue Mar. 27, 1970, Ser. No. 24,060
Int. Cl. G01d 9/40
U.S. Cl. 346—29 59 Claims Matter enclosed in heavy brackets [ ] appears in the original patent but forms no part of this reissue specification; matter printed in italics indicates the additions made by reissue.

ABSTRACT OF THE DISCLOSURE

A two-axis magnetic system for driving chart plotters and other devices. A marker carrying head floated on an air bearing over a platen with no mechanical interconnections. A plurality of electromagnets in the head and means for selectively energizing the electromagnets to move the head across the magnetic platen, and along both axes simultaneouly if desired.

This invention relates to plotters and to drive systems suitable for use with plotters and other positioning devices. The system of the invention will be described initially as incorporated in a chart or graph plotting device but other applications will be readily apparent and some will be described.

In a typical system, a piece of paper is placed on a platen or plate member and a moving element or head member carrying a chart marker is moved over the paper. The chart marker may make a continuous line or an intermittent line or may be operated under the control of an external source making a mark as desired. A variety of chart markers is presently available and may be ultilized with the system of the invention.

It is an object of the invention to provide a new and improved system which is small, light and of low inertia while having high resolution, accuracy and repeatability. A particular object is to provide such a system which may be used with any of a wide variety of signal sources. An additional object is to provide a system which may be entirely digital in operation. A further object is to provide a system which may be analog, wholly or in part.

It is an object of the invention to provide a new and improved system incorporating a magnetic drive for the moving member and one requiring no mechanical connections to the moving member. An additional object is to provide such a system which does not require any position feedback or followup information for its operation. Another object is to provide such a system which may utilize a feedback control if desired.

It is an object of the invention to provide a drive system for use in plotters and the like, which system will provide the propulsion for producing the relative motion between the members, the control of the relative position of the two members, and restraint against rotation of one member relative to the other, all acting along each of two axes and independently of each other in response to input information. The input information may be digital in nature with the motion occurring in discrete steps which are repeatable and which may be made very small.

It is an object of the invention to provide a system for controlling relative movement of two members incorporating a plate member having at one surface thereof an alternating pattern of nonmagnetic material and magnetic material, a head member having first and second parallel sets of magnets aligned with the pattern, each of the magnets having a pole face at a surface of the head member positioned adjacent the plate member surface, with the sets having corresponding magnets, and means for selectively energizing corresponding magnets of the sets for producing relative movement between the members along the pattern.

It is an object of the invention to provide a system for independent stepwise relative movement of two members along two axes incorporating a plate member having at one surface thereof a grid of nonmagnetic material enclosing zones of magnetic material with the grid defining a first axis and a second axis in the plane of the surface, a head member having a first set of magnets aligned with the first axis and a second set of magnets aligned with the second axis with each of the magnets having a pole face at a surface of the head member positioned adjacent the plate member surface, means for selectively energizing magnets of the first set for producing relative movement between the members along the first axis, and means for selectively energizing magnets of the second set for producing relative movement between the members along the second axis.

It is a further object of the invention to provide such a system wherein the head member has a first set of magnets aligned with the first axis, a second set of magnets aligned with the second axis, a third set of magnets disposed parallel with the first set, and a fourth set of magnets disposed parallel with the second set, with the energizing means selectively energizing corresponding magnets of the first and third sets and corresponding magnets of the second and fourth sets for producing the relative movements.

It is an object of the invention to provide such a system including a tool carrier for a chart marking pen or the like mounted on the head member. A further object is to provide such a system incorporating means for spacing the head member from the plate member, typically a fluid bearing comprising means defining at least one cavity at the surface of the head member and means for directing a stream of fluid under pressure into the cavity for outward flow between the surface to the surrounding atmosphere.

It is an object of the invention to provide a system incorporating new and improved magnetic structures for precise control of the relative movement of the members and for providing very small and repeatable stepping increments. An additional object is to provide such a system wherein the sets of magnets may comprise various numbers of individual magnets as desired providing for various so-called multiphase operation, with the three-magnet set and three-phase driving system being presently preferred. A further object is to provide such a system which may incorporate full-step operation and partial-step operation by varying the sequence in which the magnets of a set are energized and/or the magnitudes of the magnet energizing currents.

The invention contemplates the utilization of a plate member and a head member, with the head member separate from and movable along a surface of the plate member and with first and second pluralities of controlled electromagnetic elements in one of said members and disposed along first and second axis, respectively. The system further contemplates means for energizing selected elements of the first plurality for producing forces between the members holding the members against relative movement along the first axis and for changing the selected elements for producing forces between the members producing relative movement along the first axis, and similar independent means for energizing selected elements of the secondary plurality for controlling relative movement along the second axis.

The invention also comprises novel details of construcion and novel combinations and arrangements of parts, which will more fully appear in the course of the following description. The drawings merely show and the description merely describes preferred embodiments of the present invention which are given by way of illustration or example.

In the drawings:

FIG. 1 is a perspective view of a preferred embodiment of the invention illustrated as a chart plotter;

FIG. 2 is a bottom isometric view of the head member of the system of FIG. 1;

FIG. 3 is a sectional view taken along the line 3—3 of FIG. 2;

Figure 7:
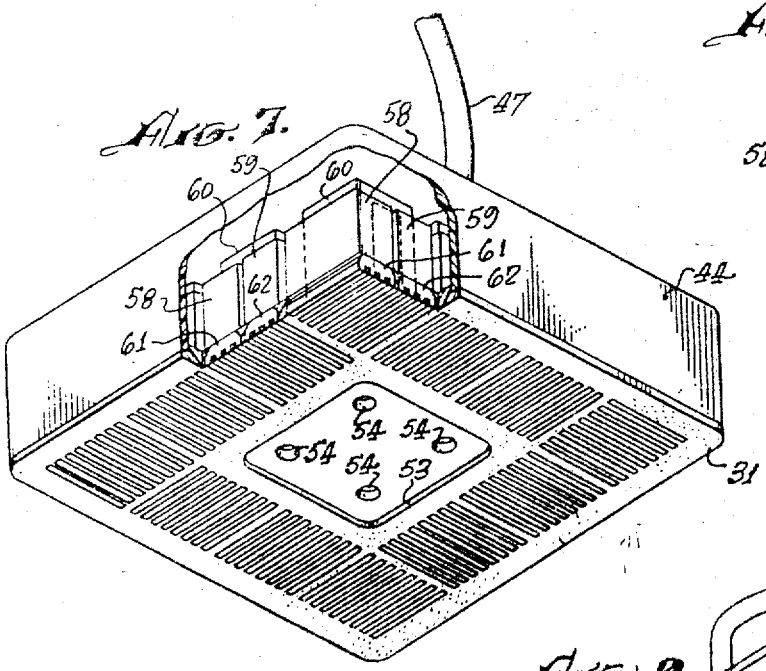
Figure 8:
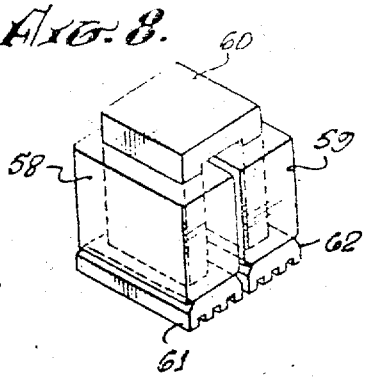
Figure 9:
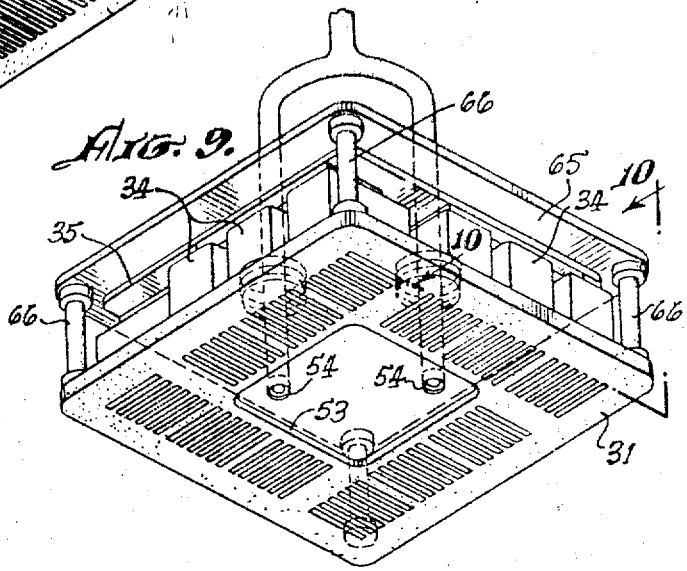
Figure 6:
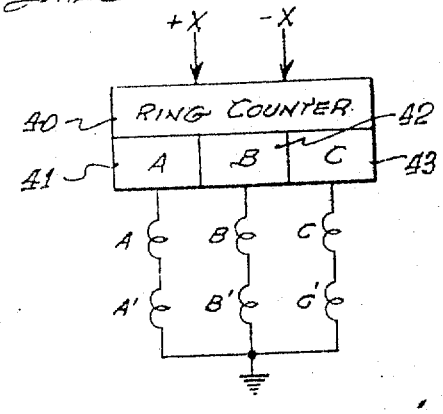
Figure 10:
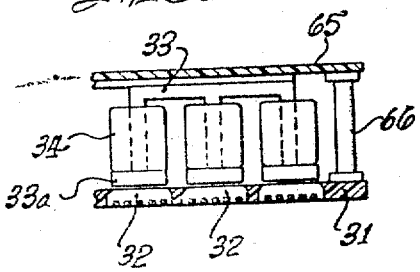

FIGS. 4 and 5 are enlarged partial sectional views taken along the lines 4—4 and 5—5, respectively, of FIG. 2, showing the head member positioned over the plate member;

FIG. 6 is a diagram of an electrical driving circuit for energizing the head member;

FIG. 7 is a view similar to that of FIG. 2 showing an alternative form of the head member;

FIG. 8 is an enlarged isometric view of one of the magnets of FIG. 7;

FIG. 9 is a view similar to that of FIGS. 2 and 7 showing another alternative form of the head member;

FIG. 10 is a partial sectional view taken along the line 10—10 of FIG. 9; and

Figure 11:
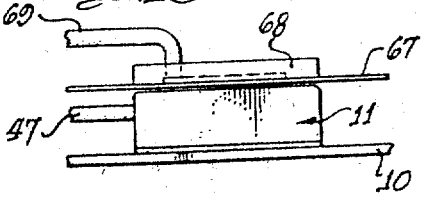

FIG. 11 is a side view illustrating another embodiment of the invention.

The system as illustrated in FIGS. 1–6 includes a plate member 10 and a head member 11. The upper surface of the plate member carries a grid 12 of nonmagnetic material enclosing zones of magnetic material, with the grid defining first and second axes which normally are orthogonal. These axes are sometimes referred to as the X axis and the Y axis.

Typically the plate member 10 may be a sheet 14 of ferromagnetic material such as iron, having a plurality of parallel grooves 15 formed therein, with one set of grooves normal to the X axis and another set of grooves normal to the Y axis. Zones or teeth of magnetic material 16 project upward between the grooves. In the preferred structure illustrated in the drawings, the grooves are at right angles to each other and are equally spaced along both axes, leaving the projecting zones of magnetic material of square cross section. In a typical structure, the grooves or slots 15 are .030-inch wide and .030-inch deep and are spaced .030-inch apart along both axes. The grooves may be left open with the air serving as a nonmagnetic material, but it is preferred to fill the grooves with a plastic or other nonmagnetic solid to provide a smooth upper surface for the plate member.

In a typical plotter, a sheet of paper 20 rests on the plate member 10 and the head member moves over the sheet 20. If desired, means may be provided for holding the paper in position on the plate member and one embodiment is illustrated in FIG. 1. A manifold 21 is positioned on the underside of the plate member 10 and communicates with a plurality of openings 22 provided in the plate member. The openings 22 may be around the periphery of the grid 12 and may be interconnected by a channel 23 in the upper surface of the plate member if desired. Openings may also be provided over the face of the grid if desired. A vacuum may be applied to the manifold 21 via line 24 for holding the paper down against the upper surface of the plate member 10. After a marking operation is completed, a slight pressure may be applied on the line 24 providing a lifting force on the sheet 20.

The head member includes four sets 27, 28, 29, 30 of magnets mounted in a base 31 with the pole faces of the magnets at the surface of the base. In one form of construction, the base 31 may be a cast plastic member with magnets embedded therein with the magnet pole faces 32 at the lower surface of the base, such as is shown in FIG. 3. Each pole face 32 has one or more ridges of magnetic material and preferably is provided with a plurality of ridges of the same width and spacing as the zones 16 of magnetic material in the plate member. The set of magnets 27 and the set of magnets 29 are disposed parallel to one of the axes of the grid, say the X axis, and are utilized to propel and position the head member along the X axis. Similarly, the sets 28 and 30 are utilized to propel and position the head member along the other axis, typically the Y axis. The sets of magnets may be identical in construction and set 27 is shown in FIG. 3 comprising an E-shaped core 33 (which could be an assembly of lamination stampings) with a pole face 32 at the end of each arm and with a coil 34 disposed about each arm. A plate 35 of magnetic material may be affixed to the tops of the cores 33, as shown in FIG. 3, to act as back iron for the return flux. The operation of the system is the same for motion along each axis and it may be operated to provide simultaneous motion along both axes to produce a diagonal motion or may be operated to provide motion along one axis and then along the other. Operation along one axis with the sets 27, 29 will be described in conjunction with FIGS. 4 and 5, recognizing that operation along the other axis will be the same.

Magnetic coupling is utilized between the head member and the plate member for moving and positioning or restraining the head member with respect to the plate member. FIG. 4 illustrates the condition with the coil of the B magnet of the set 27 energized and with the coils of the A and C magnets unenergized. Under these conditions, the head member is moved to bring the ridges of magnetic material in the pole face of the B magnet into alignment with the zones of magnetic material in the plate member. In the multiridge pole face illustrated, the spacing between the center lines of the two adjacent ridges of the pole faces of the A and B magnets and the spacing between the center lines of the two adjacent ridges of the pole faces of the B and C magnets is ⅔ of the pitch of the grid on the plate member, where the pitch is the distance from the center line of one groove or one tooth to the center line of the next groove or tooth.

If the C magnet is energized and the B magnet is de-energized, the set of magnets will be moved to the right ⅓ of the pitch to bring the pole face of the C magnet into alignment with the zones of magnetic material of the platen or plate member. If the C magnet is now de-energized and the A magnet is energized, the head member will be moved to the right another ⅓ of the pitch. De-energizing the A magnet and energizing the B magnet will move the head member to the right another ⅓ pitch bringing it back to the condition illustrated in FIG. 4. If the B magnet is now de-energized and the A magnet is energized, the head member will be moved to the left ⅓ pitch. Thus it is seen that the head member may be moved relative to the plate member in a stepwise manner by energizing the magnets of the set in the appropriate sequence. The three-magnet set illustrated requires three driving currents and is somtimes referred to as a three-phase system. It should be noted that a four-phase or higher phase system could be utilized if desired.

It should be noted that the spacing between the pole faces is not limited to that illustrated. The system will operate with any spacing that satisfies the expression:

$$s=p(n\pm 1/\phi)$$

where:

s is the distance between the center lines of the pole faces or of adjacent or outer ridges of the pole faces of the magnets which are energized in sequence in the stepping operation, p is the pitch of the grid, n is an integer, 1, 2, 3, . . ., and $\phi$ is the number of phases of the system and is greater than two.

Referring to FIG. 5, it should be noted that in the magnet set 29, the spacing between the centerlines of the two adjacent ridges of the pole faces is ⅔ of the pitch and the sequence of the three magnets of the set is the reverse of the sequence of the three magnets of the set 27, as shown in FIG. 4. The operation is the same as described in conjunction with FIG. 4. Consider the situation where the magnets B, B′ are energized initially. Then the magnets B, B′ are de-energized and the magnets A, A′ are energized. This will cause both magnet sets to move to the left providing aiding forces for moving the head member. If the sequence of magnets is the same in both sets, the spacing between the pole faces should be the same, that is, both should be $p(n+1/\phi)$ or both should be $p(n-1/\phi)$. Where a reverse sequence is utilized in one set, the spacing of one set should be $p(n+1/\phi)$ and the spacing of the other set should be $p(n-1/\phi)$. In FIG. 4, $n=1$, and in FIG. 5, $n=2$.

The use of two sets of magnets disposed in parallel produces a balanced pair of tangential forces which act on the head member in the horizontal plane, and hence tend to eliminate a net torque about an axis normal to the plate when the head is stepping. The use of two sets also produces resisting torques tending to lock the head against rotation about the axis normal to the plate when the head is static. The use of the reverse sequence tends to eliminate torques acting on the head member about an axis parallel to the plate or pole faces. This is because the normal components of attractive force are caused to act at points nearly equidistant and on opposite sides of the centroid of the head member.

A typical electrical driving circuit for one axis is shown in FIG. 6 and includes a three-stage ring counter 40 and amplifiers 41, 42, 43 which provide the current for energizing magnets AA′, BB′, and CC′, respectively. The amplifier 41 will be energized when the counter 40 is in the A stage, the amplifier 42 will be energized when the counter is in the B stage, and the amplifier 43 will be energized when the counter is in the C stage. A pulse on the +X input to the counter will advance the counter in the positive direction, i.e., from A stage to B stage or B stage to C stage or C stage to A stage. Similarly, a pulse on the −X input will advance the counter in the opposite direction.

Any suitable source may be utilized to provide the pulses to the counter input for driving the head member relative to the plate member. The system illustrated is completely digital in operation, with the head member advancing one step in the positive direction for each pulse on the plus input line and one step in the negative direction for each pulse on the minus input line. In the embodiment being described, one step is equivalent to ⅓ pitch. In an alternative arrangement, a so-called half-step operation can be achieved, in which each step is ⅙ pitch. In this mode of operation, the magnets of a set are energized in the sequence A, AB, B, BC, C, CA, A, etc., producing movements per step one half that achieved with the sequence A, B, C. This half-step mode of operation is readily achieved by modifying the logic circuits of the ring counter.

Other alternative arrangements may be utilized in higher phase systems. For example, in a five-phase system with magnets, A, B, C, D and E, the sequence A, B, C, D, E, A or the sequence A, AB, B, BC . . . may be used. The preferred sequence for magnet energization in a five-phase system is AB, ABC, BC, BCD, CD, CDE, DE, DEA, EA, EAB, AB. This sequence provides substantially equal tangential forces for each step and also provides a reduction in normal force variations. Similar results may be achieved with the 2, 3, 2, 3, sequence in higher odd phase systems, such as seven and nine.

Means are usually provided for spacing the head member from the plate member to prevent direct contact between the members or between the head member and the paper resting on the plate member and thereby eliminate friction forces between the two members. Various arrangements may be used, including fluid bearings, wheels or balls. In the embodiment of FIGS. 1–6, a cover 46 or housing is positioned over the magnets and engages the base 31 in sealing relation. A control line 47 is terminated at the cover 46 by a coupling 48. The control line 47 includes a conduit for a supply of fluid under pressure into the housing 46 and a cable for the electrical connections to the magnets. The control line 47 preferably is a highly flexible line which provides substantially no loading on the head member. A plurality of openings 49 through the base 31 provides for air flow from the interior of the head unit to the bottom surface thereof. Grooves 50 may be provided in the bottom surface of the base 31 linking the openings 49. Typically air will be used as the fluid, but other gases and liquids may be utilized for different applications.

With this arrangement, there is a constant flow of air through the control line 47 into the housing 46, through the openings 49 and outward to the atmosphere between the bottom surface of the head member and the top surface of the plate member. This air flow provides an air bearing between the two members. The attraction force provided by the magnetic coupling between the members and the repulsion force provided by the air bearing are balanced by appropriate adjustment of the air bearing orifice characteristics and the air supply pressure to maintain the head member at a substantially constant spacing above the plate member, typically in the order of one to a few thousandths of an inch.

The air bearing spacing system may take various forms and one alternative embodiment is illustrated in FIG. 7. A cavity 53 a few thousandths of an inch deep is provided in the bottom face of the base 31 centrally positioned between the pole faces of the magnet. The air conduit in the control line 47 is branched into four separate lines which terminate at four openings 54 positioned in the cavity 53. With this construction, there is no pressure differential across the housing of the head member and problems of leakage are substantially eliminated.

Referring again to FIG. 1, an appropriate tool carrier 57 is mounted on the head member 11 and typically may be disposed at one corner of the head member. The tool carrier is adapted for carrying a tool for engaging the plate member or a sheet of material positioned on the plate member. A wide variety of devices is availbale for this use and typically may comprise a marking pen with a solenoid for moving the pin into and out of engagement with the chart paper. The electrical control for such a marking pen may be contained in the control line 47.

An alternate form of magnet construction is also illustrated in the head of FIG. 7 and one magnet thereof is shown in greater detail in FIG. 8. Coils 58, 59 are positioned on the arms of a U-shaped armature 60, with the coils connected in series or in parallel to provide aiding flux in the core. Pole faces 61, 62 are carried at the respective ends of the U-shaped core 60 (which could be made of lamination stampings), the pole faces preferably being grooved in the same manner as the pole face 32 of FIG. 3, with the two pole faces spaced the width of one groove so that the two pole faces 61, 62 provide a plurality of uniformly spaced grooves and lands or ridges.

Another alternative construction for the head member is illustrated in FIGS. 9 and 10 with the housing removed. The magnet construction may be in the form shown in FIGS. 1–6 or in FIGS. 7 and 8, but with the coils and cores carried on a top member 65 and the pole faces carried in the base 31 with a small air gap between the cores and pole faces. The cores may have a wider section 33a at the air gap. The top member 65 is supported from the base 31 by a flexure support structure which may comprise a plurality of flexible rods 66, typically four rods disposed at the corners of the head member. The air bearing spacing system of FIG. 7 may be utilized with two outlets 54 in the cavity 53. The housing normally is carried on the top member 65. The tool carrier may be supported from the top member 65 or from the base 31, depending upon the type of operation desired.

The basic purpose of the construction of FIG. 9 is to increase the stepping speed. Each time the head is caused to step very large accelerations are produced. At very high stepping rates the peak forces required to act on the head would be very large. If, however, the mass that is acted upon directly is made small, such as the thin base plate 31, then the peak forces will be reduced by the ratio of the masses. Since it is not essential that the much larger mass of coils and cores be accelerated at the high rates of the base, the former can be coupled to the latter through flexible elastic elements. These are made flexible in the tangential direction and stiff in the support direction. Damping means may be used to prevent uncontrolled oscillations of the top relative to the base.

Another alternative embodiment is illustrated diagrammatically in FIG. 11 and includes the head member 11 disposed above the plate member 10. A support sheet 67 is positioned above the head member 11, and a follower unit 68 rests on the support sheet. Typically the support sheet 67 may be a thin sheet of plastic or other nonmagnetic material while the follower unit 68 and the head member 11 have coacting permanent magnets therein for coupling the follower unit to the head member. The follower unit may incorporate a fluid bearing supplied in a line 69. Another fluid bearing may be utilized between the plate 67 and the head member 11 if desired. With this embodiment, the tool carrier may be mounted in the follower unit or at the corner thereof and the chart paper or other material to be marked may rest on the support plate 67. The structure of FIG. 11 is especially suited for a high performance plotter, some advantages of which are: (1) very small, light follower unit which could be easily removed and replaced; (2) excellent chart visibility, including the option of back lighting through the support plate 67 (if translucent); (3) easy conversion to transform plotter into automatic or semi-automatic curve follower by replacing marker of unit 68 with optical pickup head; (4) high speed, high performance head member 11. The efficiency of producing tangential forces by the pole face to plate relationship is greatly increased. Since there is no paper in the air gap between the head member 11 and the plate member 10, the total gap can be made of the order of 1 mil, or about ⅕ the total gap if paper is interposed.

While the system of the invention has been described above as incorporating two sets of magnets disposed in parallel for each axis of motion, the system may be utilized with only one axis and two spaced parallel sets of magnets. In another alternative arrangement, the system may be operated for two axes with only one set of magnets per axis.

While the invention has been described above in the form of a horizontally disposed chart marking device, it is readily useful for other purposes and in other orientations. The system may be utilized to generate relative motion between the head member and the plate member for any functions which can be programmed. The plate member may be disposed vertically to provide for writing or drawing in a vertical plane. The entire system may be inverted with the head member restrained to provide motion of the plate member over the head member. With this arrangement, the plate member could carry a workpiece and the system could be utilized to digitally drive the workpiece past an operating station, such as a machine tool cutting edge. The tool carrier, of course, may be utilized to carry a wide variety of tools in addition to a chart marking pen and one typical application is an engraving tool which may be utilized in conjunction with nonmagnetic metals and other materials.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a system for controlling relative movement of two members along two axes, the combination of:

a plate member;

a head member separate from and movable along a surface of said plate member;

a first plurality of controlled electromagnetic elements in only one of said members disposed along a first axis;

a second pluarlity of controlled electromagnetic elements in said one member disposed along a second axis, with the other of said members having a layer of material providing a continuous magnetic path;

means for energizing selected elements of said first plurality for producing forces between said members holding said members against relative movement along said first axis and for changing the selected elements for producing forces between said members producing relative movement along said first axis; and means for energizing selected elements of said second plurality for producing forces between said members holding said members against relative movement along said second axis and for changing the selected elements for producing forces between said members producing relative movement along said second axis.

2. In a system for relative moveemnt of two members along two axes, the combination of:

a plate member having at one surface thereof a grid of nonmagnetic material enclosing zones of magnetic material, said grid defining a first axis and a second axis in the plane of said surface;

a head member having a first set of magnets aligned with said first axis, a second set of magnets aligned with said second axis, a third set of magnets disposed parallel with said first set, and a fourth set of magnets disposed parallel with said second set, each of said magnets having a pole face at a surface of said head member positioned adjacent said plate member surface, said first and third sets having corresponding magnets and said second and fourth sets having corresponding magnets;

means for selectively energizing corresponding magnets of said first and third sets for producing relative movement between said members along said first axis; and means for selectively energizing corresponding magnets of said second and fourth sets for producing relative movement between said members along said second axis.

3. A system as defined in claim 2 including a tool carrier mounted on said head member and having means for carrying a tool directed toward said surface of said plate member.

4. A system as defined in claim 2 including means for spacing said head member from said plate member.

5. A system as defined in claim 4 wherein said spacing means comprises means defining at least one cavity at said surface of said head member and means for directing a stream of fluid under pressure into said cavity for outward flow between said surfaces.

6. A system as defined in claim 2 wherein the sequence of the magnets of said first set is the reverse of the sequenct of the corresponding magnets of said third set and the sequence of the magnets of said second set is the reverse of the sequence of the correspondi ıg magnets of the fourth set.

7. A system as defined in calim 2 wherein the sequence of the magnets of said first set is the reverse of the the sequence of the corresponding magnets of said third set and the sequence of the magnets of said second set is the reverse of the sequence of the corresponding magnets of the fourth set, and the spacing of one of said first and third sets and of one of said second and fourth sets, between the centerlines of pole faces of magnets in the energizing sequence, is $p(n+1/\phi)$ and the spacing of the other of said first and third sets and of the other of said second and fourth sets is $p(n-1/\phi)$ where n is any whole number, p is the pitch of the grid and $\phi$ is the number of phases of the system.

8. A system as defined in claim 2 wherein said head member includes a first unit remote from said plate member and with the coils and cores of said sets of magnets carried thereon, a second unit adjacent said plate member and with the pole faces of said sets of magnets carried thereon and flexible support means coupling said second unit to said first unit.

9. A system as defined in claim 2 including a head follower member and means for supporting said head follower member in parallel relation with said head member, said head member and head follower member including interacting magnetic coupling means for coupling said members together so that the head follower member duplicates the movement of the head member.

10. A system as defined in claim 2 in which said means for energizing magnets provides for energizing the magnets of a set one at a time.

11. A system as defined in claim 2 in which said means for energizing magnets provides for energizing the magnets of a set in the sequence A, AB, B, BC, C . . ., where A, B and C designate individual magnets.

12. In a system for relative movement of two members, the combination of:

a plate member having at one surface thereof an alternating pattern of nonmagnetic material and magnetic material;

a head member having first and second parallel sets of magnets aligned with said pattern, each of said magnets having a pole face at a surface of said member positioned adjacent said plate member surface, said sets having corresponding magnets; and means for selectively energizing corresponding magnets of said sets for producing relative movement between said members along said pattern.

13. A system as defined in claim 12 including means for spacing said head member from said plate member comprising means defining at least one cavity at said surface of said head member and means for directing a stream of fluid under pressure into said cavity for outward flow between said surfaces.

14. In a system for stepwise relative movement of two members along two axis, the combination of:

a plate member having at one surface thereof a grid of nonmagnetic material enclosing zones of magnetic material, said grid defining a first axis and a second axis in the plane of said surface;

a head member having a first set of magnets aligned with said first axis and a second set of magnets aligned with said second axis, each of said magnets having a pole face at a surface of said head member positioned adjacent said plate member surface;

means for selectively energizing magnets of said first set for producing relative movement between said members along said first axis; and means for selectively energizing magnets of said second set for producing relative movement between said members along said second axis.

15. In a plotter for making charts and the like, the combination of:

a plate member having at one surface thereof a grid of nonmagnetic material enclosing zones of magnetic material, said grid defining a first axis and a second axis in the plane of said surface;

a head member having a first set of magnets aligned with said first axis, a second set of magnets aligned with said second axis, a third set of magnets disposed parallel with said first set, and a fourth set of magnets disposed parallel with said second set, each of said magnets having a pole face at a surface of said head member positioned adjacent said plate member surface, said first and third sets having corresponding magnets and said second and fourth sets having corresponding magnets, said head member including means defining at least one cavity at said surface of said head member;

means for directing a stream of fluid under pressure into said cavity for outward flow between said surfaces;

a chart marker carried on said head member positioned for marking on a chart resting on said one surface of said plate member;

means for selectively energizing corresponding magnets of said first and third sets for producing stepwise relative movement between said members along said first axis; and means for selectively energizing corresponding magnets of said second and fourth sets for producing stepwise relative movement between said members along said second axis.

16. A plotter as defined in claim 15 wherein said cavity is centrally disposed in said surface of said head member with said pole faces positioned around said cavity.

17. A plotter as defined in claim 16 wherein each of said sets of magnets comprises three magnets, with the sequence of the magnets of the third set being the reverse of the sequence of the magnets of the first set and with the sequence of the magnets of the fourth set being the reverse of the sequence of the magnets of the second set.

18. A plotter as defined in claim 15 wherein said zones of magnetic material are substantially equally spaced along said axis and wherein each of said pole faces extends over a plurality of said zones, with each pole face having a plurality of rows of magnetic material spaced by nonmagnetic material, with the spacing of said rows substantially the same as the spacing of said zones.

19. A system as defined in claim 2 in which said means for energizing provides for energizing the magnets of a set in the sequence AB, ABC, BC, BCD, CD, CDE, DE . . ., where A, B, C, D and E designate individual magnets.

20. In a plotter for making charts and the like, the combination of:

a first plate member having at one surface thereof a grid of nonmagnetic material enclosing zones of magnetic material, said grid defining a first axis and a second axis in the plane of said surface;

a second plate member disposed in spaced relation with said first plate member;

a head member having a first set of magnets aligned with said first axis, a second set of magnets aligned with said second axis, a third set of magnets disposed parallel with said first set, and a fourth set of magnets disposed parallel with said second set, each of said magnets having a pole face at a first surface of said head member positioned adjacent said first plate member surface, said first and third sets having corresponding magnets and said second and fourth sets having corresponding magnets, with said head member disposed between said plate members and including means defining at least one cavity at said first surface and at a surface opposite said first surface;

a head follower member including means defining at least one cavity at a surface thereof and disposed adjacent said second plate member;

means for directing a stream of fluid under pressure into each of said cavities for outward flow along said surfaces;

a chart marker carried on said head follower member positioned for marking on a chart resting on said second plate member;

means for selectively energizing corresponding magnets of said first and third sets for producing stepwise relative movement between said head and first plate members along said first axis; and means for selectively energizing corresponding magnets of said second and fourth sets for producing stepwise relative movement between said head and first plate members along said second axis;

said head member and head follower member including interacting magnetic coupling means for coupling said members together so that the head follower member duplicates the movement of said head member.

*21. In a system for providing a controlled relative movement between two members along first and second coordinate axes, the combination of:*

*a first member,*

*a second member disposed relative to the first member for independent displacement between the first and second members along each of the first and second coordinate axes,*

*first magnetic means operatively coupled to a particular one of the first and second members and cooperative with the other one of the first and second members for producing a magnetic interaction between the first means and the other member to provide an independent and arbitrary displacement between the first and second members along the first coordinate axis, and*

*second magnetic means operatively coupled to the particular one of the first and second members and cooperative with the other one of the first and second members for producing a magnetic interaction between the second means and the other member to provide an independent and arbitrary displacement between the first and second members along the second coordinate axis simultaneously with the displacement between the first and second members along the first coordinate axis.*

*22. In the system set forth in claim 21:*

*the other one of the first and second members having magnetic properties and the first and second means being provided with magnetic properties for cooperating with the other one of the first and second members to produce a displacement between the first and second members repsectively along the first and second axes and the first and second means having properties of becoming selectively energized to control the relative displacements between the first and second members along the first and second coordinate axes.*

*23. In the system set forth in claim 22:*

*the first magnetic means having properties of becoming selectively energized and of producing magnetic lines of force, when energized for cooperating with the other one of the first and second members to produce a displacement between the first and second members along the first coordinate axis and the second magnetic means having properties of becoming selectively energized and of producing magnetic lines of force, when energized, for cooperating with the other one of the first and second members to produce a dismplacement between the first and second members along the second coordinate axis.*

*24. In a system for providing a controlled relative movement between two members along first and second coordinate axes, the combination of:*

*a first member,*

*a second member disposed in contiguous relationship to the first member for independent displacement between the first and second members along each of the first and second coordinate axes,*

*a plurality of first means provided in the first member at spaced positions along the first and second coordinate axes to define a grid,*

*second means having magnetic properties and provided in the second member at spaced positions along the first coordinate axis, said second means being selectively energized and being disposed at particular positions relative to contiguous ones of the first means and cooperative with the first means, when selectively energized, for interacting magnetically with the first means to produce arbitrary displacements between the first means and the second means along the first coordinate axis, and*

*third means having magnetic properties and provided in the second member at spaced positions along the second coordinate axis, said third means being selectively energized and being disposed at particular positions relative to contiguous ones of the first means and cooperative with the first means, when selectively energized, for interacting magnetically with the first means to produce arbitrary displacements between the first means and the second means along the second coordinate axis simultaneously with the displacements between the first and second members along the first coordinate axis.*

*25. In a system for providing a controlled relative movement between two members along first and second coordinate axes, the combination of:*

*a first member,*

*a second member disposed in contiguous relationship to the first member for independent displacement between the first and second members along each of the first and second coordinate axes,*

*a plurality of first means provided in the first member at spaced positions along the first and second coordinate axes to define a grid,*

*second means having magnetic properties and provided in the second member at spaced positions along the first coordinate axis, said second means being selectively energized and being disposed at particular positions relative to contiguous ones of the first means and cooperative with the first means, when selectively energized, for interacting magnetically with the first means to produce arbitrary displacements between the first means and the second means along the first coordinate axis, and*

*third means having magnetic properties and provided in the second member at spaced positions along the second coordinate axis, said third means being selectively energized and being disposed at particular positions relative to contiguous ones of the first means and cooperative with the first means, when selectively energized, for interacting magnetically with the first means to produce arbitrary displacements between the first means and the second means along the second coordinate axis simultaneously with the displacements between the first and second members along the first coordinate axis.*

*26. In the system set forth in claim 25:*

*the first member defining a magnetic grid structure and each of the second means respectively having at least one element for interacting magnetically with the grid structure of the first member to provide a displacement of the first member relative to the second member along the first axis, the elements in the second means being displaced relative to each other and to the grid structure of the first member to provide for the displacement of the second member relative to the first member along the first axis, each of the third means respectively hav-* ing at least one element for interacting magnetically with the grid structure of the first member to provide a displacement of the first member relative to the second member along the second axis, the elements in the third means being displaced relative to each other and to the grid structure of the first member to provide for the displacement of the second member relative to the first member along the second axis.

27. In the system set forth in claim 26:

the first and second members being planar and being disposed in contiguous relationship to each other.

28. In the system set forth in claim 26:

the first member having magnetic characteristics the second means including first windings selectively energized for obtaining a magnetic interaction of the first means with the first member to produce a force for displacements between the first and second members along the first axis when selectively energized and the third means including second windings selectively energized for obtaining a magnetic interaction of the second means with the first member to produce a force for displacements between the first and second members along the second axis when selectively energized.

29. In a system for providing a controlled relative movement between two members along first and second coordinate axes, the combination of:

a first member, a second member spaced from the first member and movable relative to the first member along first and second coordinate axes and including first magnetic means for interacting magnetically with the first member to drive the second member relative to the first member only along the first axis and including second magnetic means for interacting magnetically with the first member to drive the second member, independently of but simultaneously with the operation of the first means, relative to the first member only along the second axis and inhibiting rotation of the second member relative to the first member about an axis substantially normal to a surface defined by the first and second axes, third means for providing for a selective energizing of the first means to obtain a selective driving of the second member relative to the first member along the first axis, and fourth means for providing for a selective energizing of the second means to obtain a selective driving of the second member relative to the first member along the second axis.

30. In the system set forth in claim 29:

the first member being in the form of a grid and the first and second members being constructed to provide simultaneous but independent movements of the second member relative to the first member along the first and second coordinate axes.

31. In the system set forth in claim 29:

the first and second members being planar and being disposed in contiguous relationship to each other.

32. In the system set forth in claim 29:

the first magnetic means being magnetically interactive with the first member for providing for the determination of the position of the second member relative to the first member along the first axis while driving the second member relative to the first member along the first axis and the second magnetic means being magnetically interactive with the first member for providing for the determination of the position of the second member relative to the first member along the second axis while driving the second member relative to the first member along the second axis.

33. In the system set forth in claim 30:

the first member being in the form of a magnetic grid and the first and second magnetic means in the second member being constructed with magnetic properties for cooperation with the magnetic grid to provide displacements along the first and second coordinate axes and the third and fourth means respectively including first and second windings respectively coupled magnetically to the first and second magnetic means.

34. In the system set forth in claim 29:

the first and second members having magnetic properties and the first magnetic means and the second magnetic means being operative magnetically upon the second member to affect the magnetic properties of the second member and, in accordance with the magnetic interaction between the first and second members, the magnetic properties of the first member to obtain a driving of the second member relative to obtain a driving of the second member relative to the first member along the first and second axes.

35. In a system for providing a controlled relative movement between two members along first and second coordinate axes, the combination of:

a first member, a second member spaced from the first member and movable relative to the first member along the first and second coordinate axes and including first magnetic means for producing a magnetic interaction with the first member to drive the second member relative to the first member along the first axis and for simultaneously providing for a determination of the position of the second member relative to the first member along the first axis and further including second magnetic means for producing a magnetic interaction with the first member to drive the second member relative to the first member along the second axis simultaneously with the drive of the second member relative to the first member along the first axis and for simultaneously providing for a determination of the position of the second member relative to the first member along the second axis, third means for providing for a selective energizing of the first magnetic means to obtain a selective driving of the second member relative to the first member along the first axis, and fourth means for providing for a selective energizing of the second magnetic means to obtain a selective driving of the second member relative to the first member along the second axis.

36. In the system set forth in claim 35:

the first and second members being constructed to provide simultaneous but independent movements of the first member relative to the second member along the first and second coordinate axes.

37. In the system set forth in claim 35:

the first member being in the form of a magnetic grid and the first and second means being provided with magnetic properties and being disposed for magnetic cooperation with the first member to provide arbitrary movements along the first and second axes and the third and fourth means respectively including first and second windings respectively coupled magnetically to the first and second magnetic means.

38. In the system set forth in claim 35:

the first and second members being planar and being disposed in contiguous relationship to each other.

39. In a system for providing a controlled relative movement between two members along first and second coordinate areas, the combination of:

a first member, a second member disposed relative to the first member for independent movement relative to the first member along the first and second coordinate axes, the first and second members being constructed to provide for an indication of the position of the first and second members relative to each other along the first and second coordinate axes in accordance with the movements of the first member relative to the second member along the first and second coordinate axes, first magnetic means disposed on the second member and selectively energizable for producing a magnetic force between the first and second members to provide an independent movement of the second member relative to the first member along the first axis, second magnetic means disposed on the second member and selectively energizable for producing a magnetic force between the first and second members to provide an independent movement of the second member relative to the first member along the second axis simultaneously with the movement of the second member relative to the first member along the first axis, third means for selectively energizing the first magnetic means, and fourth means for selectively energizing the second magnetic means.

40. In the system set forth in claim 39:

the first and second members being constructed relative to each other to provide discrete movements of the first member relative to the second member along the first and second axes.

41. In the system set forth in claim 39:

the first and second members having magnetic characteristics and the third means including first windings energizable to produce a magnetic force between the first member and the first magnetic means for providing a movement of the second member relative to the first member along the first axis and the fourth means including second windings energizable to produce a magnetic force between the first member and the second magnetic means for providing a movement of the second member relative to the first member along the second axis.

42. In the system set forth in claim 39:

the first means being constructed to inhibit rotation of the second member relative to the first member about an axis substantially normal to the surface defined by the first and second axes.

43. In the system set forth in claim 39:

the first and second members being planar and being disposed in contiguous relationship to each other.

44. In a system for providing a controlled relative movement between two members along first and second coordinate axes, the combination of:

a first member, a second member disposed in displaced relationship to the first member for movement relative to the first member independently along the first and second coordinate axes, first magnetic means mounted on the second member for interacting magnetically with the first member to produce an independent movement of the second member relative to the first member along the first axis, second magnetic means mounted on the second member for interacting magnetically with the first member to produce an independent movement of the second member relative to the first member along the second axis simultaneously with the movement of the second member relative to the first member, and third means disposed on the second member and cooperative with the first member for maintaining the second member in displaced but contiguous relationship to the first member.

45. In the system set forth in claim 44:

the third means constituting a hydrostatic air bearing.

46. In the system set forth in claim 44:

the first magnetic means being constructed to interact with the first member in inhibiting the rotation of the second member relative to the first member about an axis substantially normal to the surface defined by the first and second axes.

47. In the system set forth in claim 46:

the first and second members being planar.

48. In the system set forth in claim 21:

the first magnetic means being constructed to prevent rotation of the second member relative to the first member about an axis substantially normal to a surface defined by the first and second axes.

49. In a system for providing a controlled relative movement between two members along a particular axis, the combination of:

a first member, a second member spaced from the first member and movable relative to the first member along the particular axis and including first magnetic means disposed on the second member for interacting magnetically with the first member to drive the second member relative to the first member along the particular axis and second magnetic means disposed on the second member and cooperative with the first magnetic means for interacting magnetically with the first member to inhibit rotation of the second member relative to the first member on any axis substantially normal to the surface of the first member, and second means for providing for a selective energizing of the first and second magnetic means to obtain a driving of the second member relative to the first member along the particular axis.

50. In the system set forth in claim 49, the first and second members being planar and being disposed in contiguous relationship to each other and the particular axis being linear.

51. In the system set forth in claim 49, the first magnetic means being cooperative with the first member for providing for the determination of the position of the second member relative to the first member along the particular axis while driving the first member relative to the second member along the particular axis.

52. In a system for providing a controlled relative movement between two members along a particular axis, the combination of:

a first member, a second member spaced from the first member and movable relative to the first member along the particular axis and including first magnetic means disposed on the second member for interacting magnetically with the first member to drive the second member relative to the first member along the particular axis and to simultaneously provide for a determination of the position of the second member relative to the first member along the particular axis, second means for providing for a selective energizing of the first magnetic means to obtain a driving of the second relative to the first member along the particular axis, and third means disposed on the second member for providing an air bearing to maintain the second member in displaced but contiguous relationship to the first member.

53. In the system set forth in claim 52 the first magnetic means including at least one winding for selectively energizing the first magnetic means.

54. In a system for providing a controlled relative indication of displacements between two members along first and second coordinate axes, the combination of:

a first member, a second member disposed relative to the first member for independent displacement between the first and second members along each of the first and second coordinate axes, first magnetic means operatively coupled to a particular one of the first and second members and cooperative with the other one of the first and second members for producing a magnetic interaction between the first magnetic means and the other member to provide for an independent indication of a displacement between the first and second members along the first coordinate axis, and second magnetic means operatively coupled to the particular one of the first and second members and cooperative with the other one of the first and second members for producing a magnetic interaction between the second magnetic means and the other member to provide for an independent indication of a displacement between the first and second members along the second coordinate axis simultaneously with the displacement between the first and second members along the first coordinate axis.

55. In the system set forth in claim 54:

the other one of the first and second members having magnetic properties and the first and second magnetic means being provided with magnetic properties and being respectively provided with first and second windings for cooperating with the other one of the first and second members to provide for an indication of displacement between the first and second members respectively along the first and second axis.

56. In the system set forth in claim 55:

the first magnetic means having properties of becoming selectively energized by the first winding and of producing magnetic lines of force, when energized, for cooperating with the other one of the first and second members to provide for an indication of a displacement between the first and second members along the first coordinate axis and the second magnetic means having properties of becoming selectively energized by the second winding and of producing magnetic lines of force, when energized, for cooperating with the other one of the first and second members to provide for an indication of a displacement between the first and second members along the second coordinate axis.

57. In a system for providing a controlled relative indication of displacement between two members along first and second coordinate axes, the combination of:

a first member, a second member disposed in contiguous relationship to the first member for independent displacement between the first and second members along each of the first and second coordinate axes, a plurality of first magnetic means provided in the first member at spaced positions along the first and second coordinate axes to define a magnetic grid, second magnetic means provided in the second member at spaced positions along the first coordinate axis, said second magnetic means being selectively energized and being disposed at particular positions relative to contiguous ones of the first magnetic means and cooperative with the first magnetic means, when selectively energized, for interacting magnetically with the first means to provide for indications of displacements between the first magnetic means and the second magnetic means along the first coordinate axis, and third magnetic means provided in the second member at spaced positions along the second coordinate axis, said third magnetic means being selectively energized and being disposed at particular positions relative to contiguous ones of the first magnetic means and cooperative with the first magnetic means, when selectively energized, for interacting with the first magnetic means to provide for indications of displacements between the first magnetic means and the second magnetic means along the second coordinate axis.

58. In the system set forth in claim 57:

the first member defining a magnetic grid structure and each of the second magnetic means respectively having at least a pair of elements for interacting with the magnetic grid structure of the first member to provide for an indication of displacement of the first member relative to the second member along the first axis, the elements in the second magnetic means being displaced relative to each other and to the magnetic grid structure of the first member to provide for the indication of displacement of the second member relative to the first member along the first axis, each of the third magnetic means respectively having at least a pair of elements for interacting with the magnetic grid structure of the first member to provide for an indication of displacement of the first member relative to the second member along the second axis, the elements in the third magnetic means being displaced relative to each other and to the magnetic grid structure of the first member to provide for the indication of displacement of the second member relative to the first member along the second axis.

59. In the system set forth in claim 26:

the first member having magnetic characteristics and the second magnetic means including windings and having magnetic characteristics for interacting with the first member to provide for indications of displacements between the first and second members along the first axis when selectively energized and the third magnetic means including windings and having magnetic characteristics for interacting with the first member to provide for indications of displacements between the first and second members along the second axis when selectively energized and the first member being planar.

References Cited

The following references, cited by the Examiner, are of record in the patented file of this patent or the original patent.

UNITED STATES PATENTS

| | | | |
|---|---|---|---|
| 1,736,613 | 11/1929 | McCoshen | 40—106.45 |
| 3,268,747 | 8/1966 | Snowdon | 310—13 |
| 3,273,727 | 9/1966 | Rogers et al. | 310—13 X |
| 3,328,801 | 6/1967 | Boyle et al. | 346—31 |
| 2,847,859 | 8/1958 | Lynott | 33—1 X |

OTHER REFERENCES

Thompson, L. J.: Linear Incremental Motor, IBM Technical Disclosure Bulletin, vol. 6, No. 9, February, 1964. pp. 19–20.

JOSEPH W. HARTARY, Primary Examiner

U.S. Cl. X.R.

310—12; 318—38, 135

BEST COPY AVAILABLE.